United States Patent
Smith et al.

(10) Patent No.: US 7,170,223 B2
(45) Date of Patent: Jan. 30, 2007

(54) EMITTER WITH DIELECTRIC LAYER HAVING IMPLANTED CONDUCTING CENTERS

(75) Inventors: James Denning Smith, Albany, OR (US); Paul Benning, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 10/197,722

(22) Filed: Jul. 17, 2002

(65) Prior Publication Data

US 2004/0012338 A1    Jan. 22, 2004

(51) Int. Cl.
*H01J 1/62*    (2006.01)

(52) U.S. Cl. ................... 313/495; 315/169.3

(58) Field of Classification Search ........... 313/292, 313/336, 351, 495, 497; 315/169.1, 169.3; 445/24
See application file for complete search history.

(56) References Cited

U.S. PATENT DOCUMENTS

| | | | |
|---|---|---|---|
| 4,693,782 A | 9/1987 | Kikuchi et al. | 438/365 |
| 4,737,781 A * | 4/1988 | Robillard | 340/763 |
| 4,794,308 A * | 12/1988 | Ernsthausen | 313/587 |
| 4,923,421 A | 5/1990 | Brodie et al. | 445/24 |
| 5,142,184 A | 8/1992 | Kane | 313/309 |
| 5,374,844 A | 12/1994 | Moyer | 257/582 |
| 5,504,385 A * | 4/1996 | Jin et al. | 313/310 |
| 5,507,676 A | 4/1996 | Taylor et al. | 445/50 |
| 5,528,103 A | 6/1996 | Spindt et al. | 313/497 |
| 5,529,524 A | 6/1996 | Jones | 445/24 |
| 5,548,181 A | 8/1996 | Jones | 313/495 |
| 5,557,596 A | 9/1996 | Gibson et al. | 369/101 |
| 5,559,342 A | 9/1996 | Tsukamoto et al. | 257/10 |
| 5,587,623 A | 12/1996 | Jones | 405/262 |
| 5,619,097 A | 4/1997 | Jones | 313/309 |
| 5,760,417 A | 6/1998 | Watanabe et al. | 257/11 |
| 6,011,356 A | 1/2000 | Janning et al. | 315/169.4 |
| 6,023,124 A | 2/2000 | Chuman et al. | 313/310 |
| 6,033,924 A | 3/2000 | Pack et al. | 438/20 |
| 6,313,043 B1 | 11/2001 | Hattori | 438/745 |
| 6,772,872 B2 * | 8/2004 | Spangenberg et al. | 198/442 |
| 2001/0054866 A1 * | 12/2001 | Cathey et al. | 313/495 |
| 2002/0036461 A1 * | 3/2002 | Schoenbach et al. | 313/495 |
| 2003/0137236 A1 * | 7/2003 | Tuck et al. | 313/495 |

FOREIGN PATENT DOCUMENTS

| | | |
|---|---|---|
| EP | 0986084 A2 | 3/2000 |
| EP | 1094485 A2 | 4/2001 |
| JP | 63150837 | 6/1988 |
| WO | WO01/80273 A1 | 10/2001 |

OTHER PUBLICATIONS

European Search Report for Application No. EP 03254323, filed Jul. 8, 2003 (search completed on Feb. 17, 2005).

\* cited by examiner

*Primary Examiner*—Tuyet Vo
*Assistant Examiner*—Jimmy Vu

(57) ABSTRACT

An emitter has a dielectric layer formed on a conductor, with a thin metal layer over the dielectric. A plurality of conducting centers is in the dielectric layer to allow electrons to pass through the dielectric from the conductor to the thin metal layer via quantum tunneling.

44 Claims, 6 Drawing Sheets

EMITTER WITH DIELECTRIC LAYER HAVING IMPLANTED CONDUCTING CENTERS

FIELD OF THE INVENTION

The invention is in the microelectronics field. The invention particularly concerns emitters and devices incorporating emitters.

BACKGROUND OF THE INVENTION

Emitters have a wide range of potential applicability in the microelectronics field. An emitter emits electrons in response to an electrical signal. The controlled emissions form a basis to create a range of useful electrical and optical effects. Prior conventional emitters include spindt tip cold cathode devices.

Challenges presented by spindt tip emitters include their manufacturability and stability over their service life. Manufacturing of spindt tip emitters requires a number of relatively difficult deposition steps, with the result that it is generally expensive and time consuming. Once formed, a tip may be unstable as it can change as it is operated, and is subject to damage if not operated in high vacuum.

Traditional flat emitters are comparably advantageous because they present a larger emission surface that can be operated in less stringent vacuum environments. Flat emitters include a dielectric emission layer that responds to an electrical field created by a potential applied between an electron source and a thin metal layer on either side of a dielectric layer. Electrons travel from the junction of the source and dielectric to the conduction band of the dielectric somewhere in the dielectric layer. Once into the conduction band, the electrons are ballistically accelerated towards the thin metal. The electrons then travel through the thin metal and exit the emitter.

SUMMARY OF THE INVENTION

According to the invention, an emitter comprises an electron source layer, a dielectric layer formed on the electron source layer, and a thin metal layer formed on the dielectric layer. The dielectric layer has a plurality of conducting centers therein.

DETAILED DESCRIPTION OF THE INVENTION

The present invention concerns an emitter having a dielectric layer deposited on an electron supply layer, with a thin metal layer deposited on the dielectric layer. The dielectric layer has a plurality of conducting centers therein, which preferably comprise implanted metal ions. The conducting centers may facilitate travel of electrons through the dielectric by quantum tunneling. Other invention embodiments may be directed to devices incorporating an emitter, with examples including an integrated circuit, a display device, and a memory device.

Figure 1:
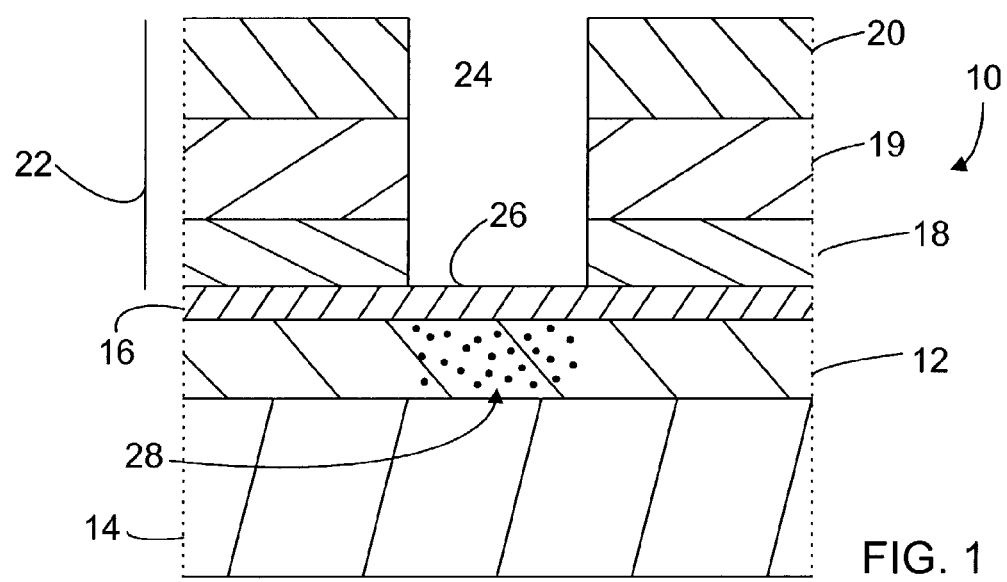
FIG. 1 is a cross section of a preferred embodiment emitter of the invention.

Turning now to the drawings, a preferred embodiment emitter 10 of the invention is shown in cross section in FIG. 1. A dielectric layer 12 is formed on an electron source layer 14. The dielectric layer 12 preferably comprises a nitride or an oxide of transition metals. Preferred materials include nitrides and oxides of Si or Ti For example, the dielectric layer 12 may comprise a material of the formula $AO_x$ where A is one of Si or Ti, and where x is any integer from 1 to 3. The electron source layer 14 may comprise any of a plurality of suitable materials, with semi-conductors and conductors such as metals and metallic compounds being examples. By way of particular example, the electron source layer 14 may comprise silicon or polysilicon, such as a N++ doped silicon wafer, or the like. The thicknesses of the electron source layer 14 and the dielectric layer 12 will be selected depending on factors such as the end use application for the emitter 10, the materials used for construction of the layers 12–14, and the like.

Designers applying the invention will understand that an optimized thickness of the dielectric layer 12 produces maximum emission efficiency. Thinner layers reduce the tunneling resistance of the layer and produce emissions at lower voltages, while increasing the thickness of the layer 12 will increase its tunneling resistance. If the dielectric layer 12 is too thin, high leakage current and electric shorting are possible, while if it is too thick, the emission current will be greatly reduced. A willingness to allow higher voltages will permit the use of thicker layers, while a need to limit voltages will call for a thinner layer. In sum, when lower voltages are critical, thinner layers produce emissions at lower voltages with the absolute minimum represented by the work function of the emission surface. When higher voltages are possible, thicker layers produce increased emissions. By way of reference, it is believed that a useful thickness range for the dielectric layer 12 for many applications will be between about 0.01 micron and about 1 micron, and more preferably between about 0.01 micron and about 0.1 micron. In considering the thickness of layers, it will be appreciated that the Figures have not been drawn to scale.

A thin metal layer 16 is formed on the dielectric layer 12. The thin metal layer 16 is formed of a metal or alloy, with a preferred thin metal layer 16 comprising a Pt layer. Alternate preferred materials are Al, Au, Ta, TiN, and combinations of Pt, Au or Ta. Other useful metals include Mo, Ir, Ru and Cr. Also, other refractive metals and alloys may be used. The thin metal layer 16 should be of a thickness large enough to provide a sufficient electric field and yet be small enough so as to permit electron and photon emissions to escape through the layer 16. Artisans will appreciate that the thickness of the layer 16 may be selected according to various design factors such as applied bias voltage, thickness of the layer 12, materials of construction, end use of the emitter, and the like. By way of example, a practical thickness range for the thin metal layer 16 may be between about 50 to about 100 Angstroms.

A plurality of film layers 22 is deposited over the thin metal layer 16. The individual layers 18, 19 and 20 may comprise conductive layers, dielectrics, semi-conductors, or the like. They may form a contact structure or the like. For example, one or more of the layers 18, 19 and 20 may function as an electrical contact for communicating a voltage potential to the thin metal layer 16. The plurality of layers 22 has been shown as having three layers for illustration purposes only, it will be understood that fewer or more layers may be present as may be desired for a particular application. Indeed, some emitters of the invention may have only a single film layer placed over the thin metal layer. A well 24 is defined in the plurality of layers 22, with at least a portion of the thin metal layer 16 defining an emission area 26 at the base of the well 24.

A plurality of electrically isolated conducting centers 28 is in the dielectric layer 12 proximate the emission area 26. Preferably, the conducting centers 28 comprise clusters of implanted metal ions. More preferably, the implanted metal ions are at least partially diffused so that their conductivity is improved. Most preferably, the metal ions are substantially in the form of clusters of crystals or nanocrystals. If the dielectric layer 12 comprises a Si containing material, the conducting centers 28 preferably comprise Si ions. Likewise, if the dielectric layer 12 comprises a compound containing Ti, the conducting centers preferably comprise Ti ions.

In operation of the emitter 10, the conducting centers 28 facilitate quantum tunneling of electrons from the source layer 14, through the dielectric layer 12, and into the thin metal layer 16 when a bias is applied between the thin metal layer 16 and the source layer 14. The electrons may then pass through the thin metal layer 16 to be emitted upwards out of the well 24. Accordingly, the conducting centers 28 are preferably spatially arranged to facilitate quantum tunneling.

Those knowledgeable in the art will appreciate that such spatial arrangement will depend on factors such as the size of the conducting centers 28, the thickness of the dielectric layer 12, the bias applied across the dielectric layer 12, the materials of composition of the dielectric layer 12 and conducting centers 28, and the like. The spatial arrangement of the conducting centers 28 may be controlled to some degree through control of their implanting; for instance by controlling an ion implanting gun. Varying the energy used to implant the ions with an ion-implanting gun can vary the depth into the layer 12 that the implanted ions penetrate (i.e., vary Z axis location). Also, aiming of the implanting gun can be useful to control the length and width placement of the implanted ions (e.g., X-Y axis location).

By way of a particular example of conducting center spatial arrangement, it is believed that conducting centers having a diameter of about 5 to about 100 Angstroms will be useful in a dielectric layer having a thickness of about 0.01 to about 1 micron, and that a separation distance between the conducting centers from one another of about 5 to about 50 Angstroms. More preferably, the centers will have a diameter of about 5 to about 50 Angstroms, and will be spaced from one another by about 5 to about 25 Angstroms. It will be appreciated that the conducting centers 28 may not be spherical in shape, but for sake of convenience they may be approximated to be substantially spherically shaped. Accordingly, the term "diameter" as applied to the conducting centers 28 herein is intended as a term of approximation only, and should not be interpreted to limit the conducting centers 28 to being circular, spherical or for that matter to any particular geometry.

There are a wide-range of potential uses of emitters of the invention such as the emitter 10 of FIG. 1 due to the general utility of emissions as a basis for electrical, electrochemical, and electro optical effects. Further, emitters of the invention are easily incorporated into integrated circuit fabrication techniques. A few particularly preferred applications of the emitter will now be discussed by way of example.

Figure 2:
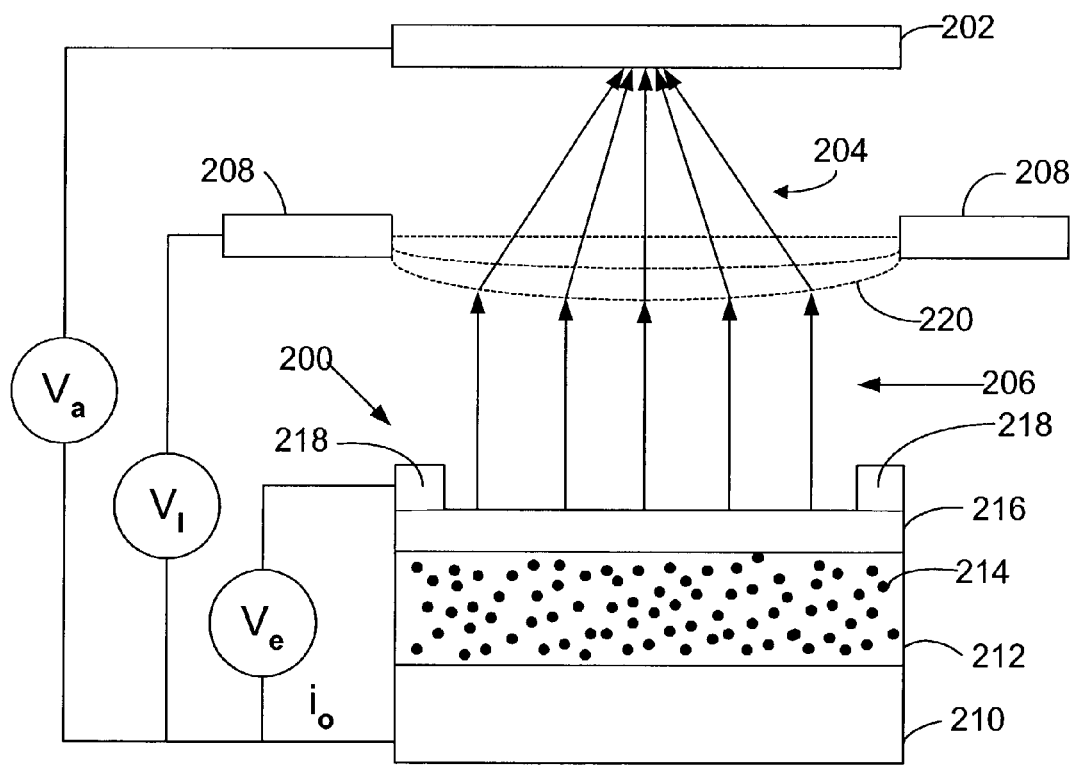
FIG. 2 is a schematic of a preferred embodiment emitter device of the invention.

FIG. 2 is an exemplary schematic of a preferred application of an emitter 200 where a target anode medium 202 receives focused emissions 204. In this application, the emissions 206 from the emitter 200 of the invention are focused by an electrostatic focusing device or lens 208. The emitter 200 generally comprises an electron source layer 210, a dielectric layer 212 with a plurality of conducting centers 214 implanted therein, a thin metal layer 216, and a metal contact structure 218 that may comprise one or more individual layers. Application of a voltage $V_e$ potential between the metal contact structure 218 and the electron source layer 210 establishes an electric field between the layer 210 and the thin metal layer 216. This field causes electrons to travel by a quantum tunneling mechanism through the dielectric layer 212 and into the thin metal layer 216 from which they will be emitted and focused by the lens 208.

Within the lens 208, an aperture 220 in a conductor can be set at a predetermined voltage that can be adjusted to change the focusing effect of the lens 208. Those skilled in the art will appreciate that the lens 208 can be made from more than one conductor layer to create a desired focusing effect. The emissions 206 are focused by the lens 208 into a focused beam 204 directed onto a target anode medium 202. The target anode medium 202 is set at an anode voltage $V_a$. The magnitude of $V_a$ will depend on the intended emitter use, the distance between the anode medium 202 and the emitter 200, as well as other factors.

For example, with the anode medium being a recordable memory medium for a storage device, $V_a$ might be chosen to be between 500 and 2000 volts. The lens 208 focuses the electron emissions 206 by forming an electric field in the aperture 220 in response to voltage $V_l$ within its aperture. By being set at a proper voltage difference from $V_e$, the emitted electrons 206 from the emitter 200 are directed to the center of the aperture and then further attracted to the anode medium 202 to form the focused beam 204.

The anode medium 202 may be configured as appropriate for any of several emitter applications, with two preferred applications including a visual display and a memory. In these two applications, the medium 202 will be a visual display medium and a memory medium, respectively. If the anode medium 202 comprises a display, the focusing of the beam onto the anode medium 202 can be used to produce an effect to stimulate a visual display. Similarly, if the anode medium 202 comprises a memory medium, the electrochemical properties of the medium may be changed through the focused beam 204. These changes may be "coded" in a binary or other manner to store retrievable information, for instance by spatially organizing portions of the anode medium 202 and then selectively changing some of those portions through the emitted electrons 204. A visual display medium and a memory medium may employ a plurality of emitters 200 arranged in an array, and may employ a mover such as a micro-positioner driven by a motor for moving one or the other of the emitter 200 and the anode medium 202 relative to the other. Also, a control circuit may be used to control the emitters 200 and/or other components.

Figure 3:
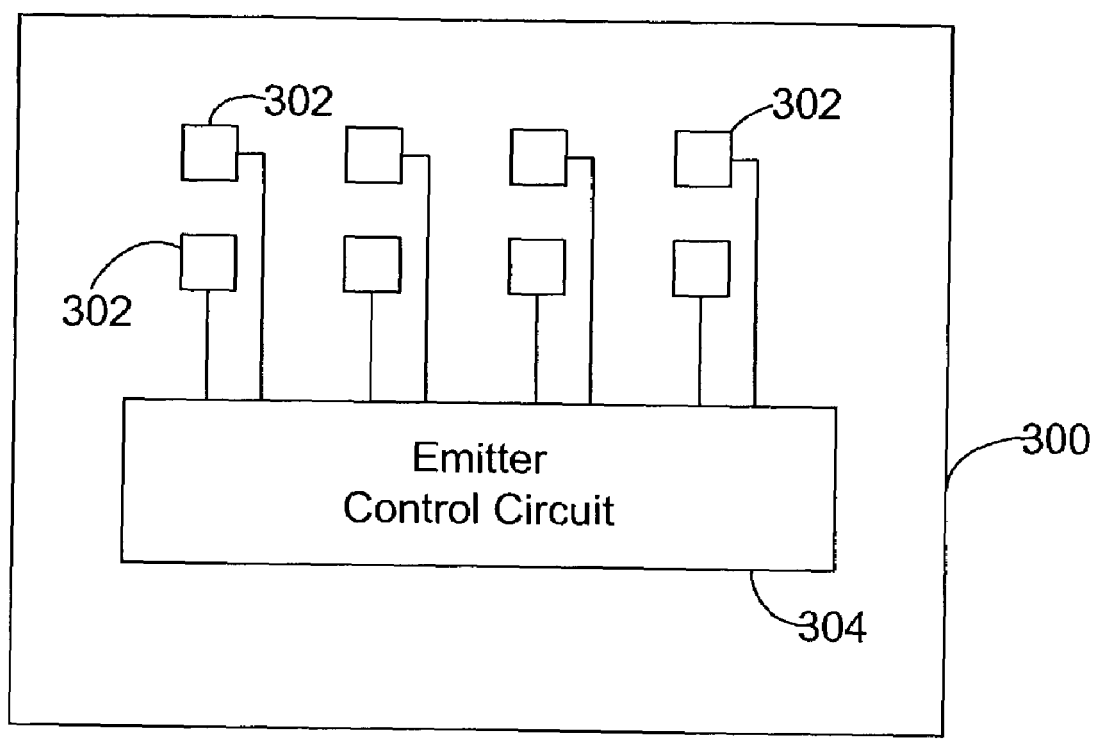
FIG. 3 is a schematic of a preferred embodiment integrated emitter circuit of the invention.

FIG. 3, for example, is a schematic of an exemplary integrated circuit embodiment 300 of the invention that includes at least one integrated emitter 302, and preferably a plurality of integrated emitters 302 arranged in an array. An emitter control circuit 304 is integrated onto the integrated circuit 300 and used to operate the at least one integrated emitter 302. Emitters 302 of the invention are thus incorporated into an integrated circuit, which is possible by virtue of the nature of the present emission layer.

Figure 4:
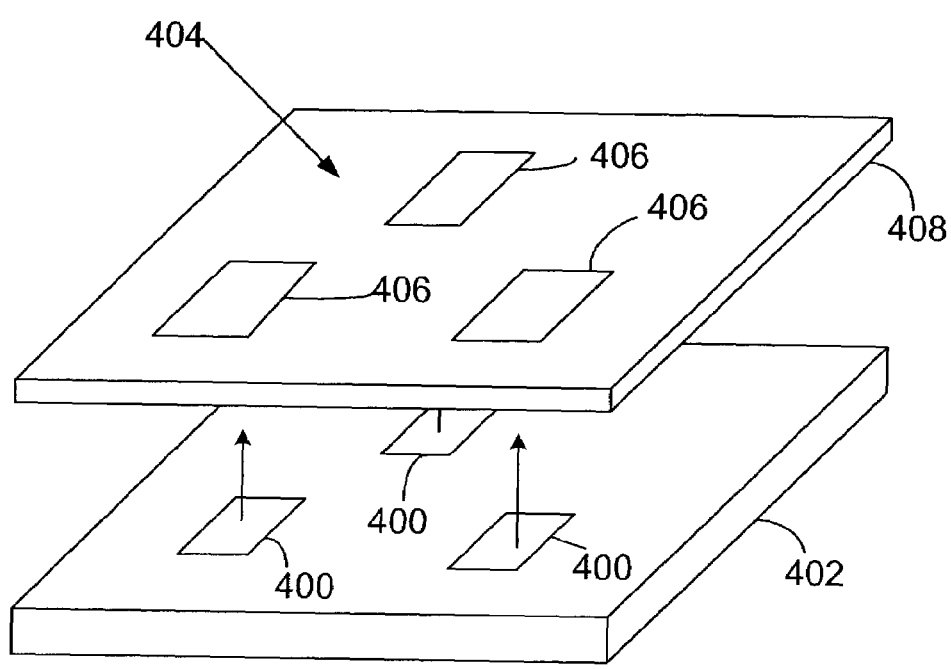
FIG. 4 is a schematic of a preferred embodiment emitter display device of the invention.

FIG. 4 is a schematic embodiment of a display application using an integrated emitter 400 of the invention. In particular, this embodiment entails a plurality of emitters 400 formed in an integrated circuit 402. Each of the emitters 400 emits electrons, as generally illustrated by the upwardly directed arrows of FIG. 4. An anode structure 404 having a plurality of individual pixels 406 that form a display 408 receives the emitted electrons. The pixels 406 are preferably a phosphor material that creates photons when struck by emissions from the emitters 400.

Figure 5A:
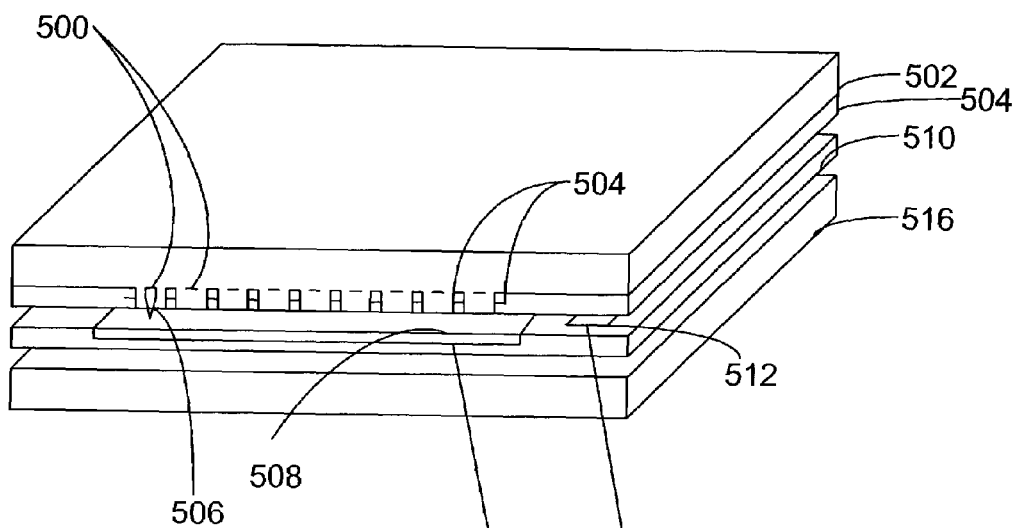
FIGS. 5A and 5B are schematics of a preferred embodiment emitter memory device of the invention.
Figure 5B:
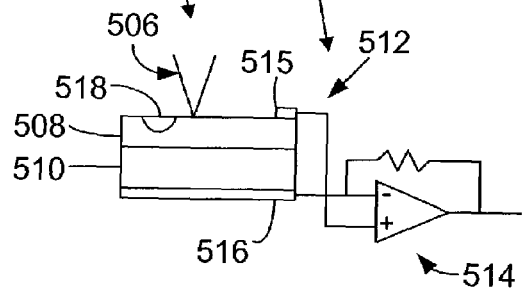

A particular preferred memory device is schematically shown in FIGS. 5A and 5B. The memory device includes integrated emitters 500. In this exemplary embodiment, an integrated circuit (IC) 502 including a plurality of integrated emitters 500 has a lens array 504 of focusing mechanisms aligned with the integrated emitters 500. The lens 504 is used to create a focused beam 506 that affects a recording surface made of the media 508. The media 508 is linked to the mover 510 that positions the media 508 with respect to the integrated emitters 500 on the IC 502. Preferably, the mover 510 has a reader circuit 512 integrated within. The reader circuit 512 is illustrated as an amplifier 514 making a first ohmic contact 515 to the media 508 and a second ohmic contact 516 to the mover 510, preferably a semiconductor or conductor substrate.

When a focused beam 506 strikes the media 508, if the current density of the focused beam is high enough, the media is phase-changed to create an affected media area 518. When a low current density focused beam 506 is applied to the media 508 surface, different rates of current flow are detected by the amplifier 514 to create reader output. Thus, by affecting the media 508 with the energy from the emitter 500, information is stored in the media using structural phase changed properties of the media. An exemplary phase-change material is InSe. Other phase change materials are known to those skilled in the art.

Figure 6:
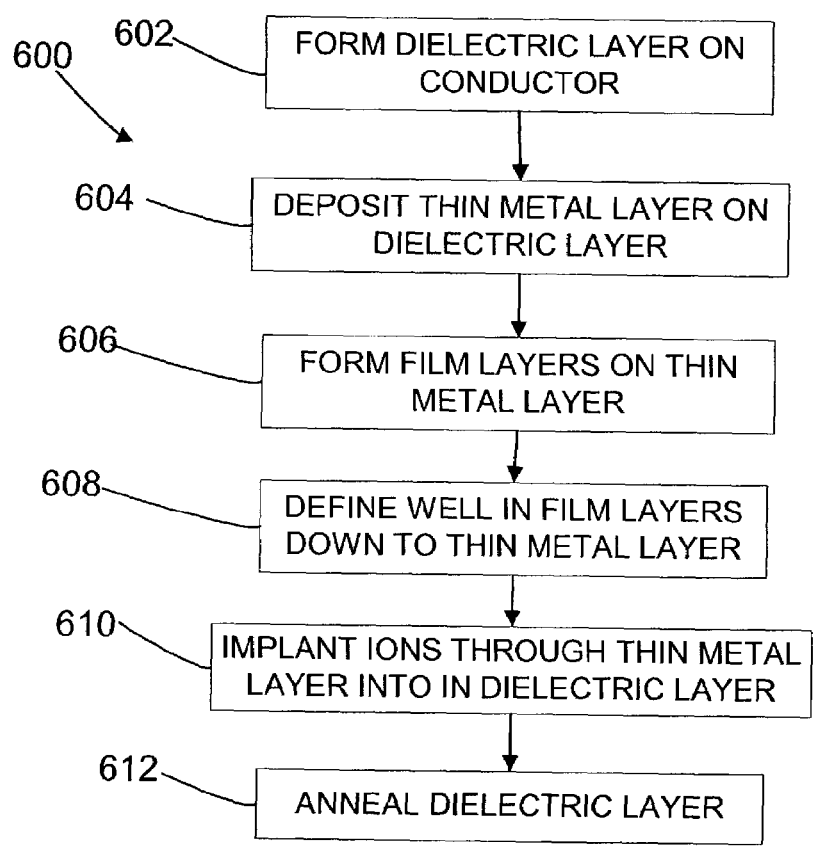
FIG. 6 is a flowchart illustrating a preferred embodiment method of making an emitter of the invention.

FIG. 6 is a flowchart illustrating steps of a preferred embodiment method 600 of making an emitter of the invention. Preferred aspects of the preferred embodiment emitter 10 of FIG. 1, such as layer composition materials, layer thicknesses, conducting center diameters, and conducting center spacing, will likewise apply to a preferred method embodiment of the invention. With this in mind, a preferred method embodiment of the invention will be described with reference to the preferred embodiment emitter 10 by way of best illustrating the method embodiment.

Referring now to the flowchart of FIG. 6 as well as the emitter 10 of FIG. 1, the preferred embodiment method 600 begins with a step of forming a dielectric layer 12 on an electron source layer 14 (block 602). A thin metal layer 16 is then deposited on the dielectric layer 12 (block 604). The dielectric layer 12 and thin metal layer 16 are preferably formed using a metal organic chemical vapor or sputter deposition process that is amenable to the incorporation of the invention into circuits and integrated circuit device applications. Those skilled in the art will recognize other appropriate deposition processes, such as wet chemistry. A plurality of layers 22 is then deposited on the thin metal layer to form a contact or via structure (block 606). In practice of the invention, the individual layers 18, 19 and 20 may comprise conductors, dielectrics, or semiconductors, and may form part of separate metal interconnect patterns in an integrated circuit. The layers 18, 19 and 20 are preferably deposited using the same method(s) as appropriate for the dielectric and thin metal layers.

A well 24 is formed in the plurality of layers 22 down to the thin metal layer 16, with a base of the well being defined by a portion of the thin metal layer 16 (block 608) to form an emission area 26. Methods for forming the well 24 include those used in the integrated circuit making arts, including but not limited to photo/etching processes that may utilize a mask. Artisans will appreciate that it may be desirable to further perform a step of providing a thin protective layer on the thin metal layer 16 prior to depositing the plurality of film layers to protect the thin metal layer 16 from damage during etching when the well 24 is defined. Whether or not a protective layer is desirable may depend on factors such as the type of material used for the thin metal layer 16, the particular method used to define the well 24, the thickness of the layer 16, and the like.

A plurality of conducting centers 28 is then implanted through the thin metal layer 16 and into the dielectric layer 12 (block 610). Preferably, the conducting centers 28 comprise metal ions. Implanting of the ions may be achieved, for example, through use of an ion implanter gun. Preferably, the method further comprises a step of treating the implanted ions to at least partially diffuse them to increase their conductivity (block 612). Application of energy to the ions can cause them to at least partially diffuse. The preferred treatment comprises annealing the implanted ions. For example, the emitter can be heated and held at an elevated temperature for a time sufficient to cause some diffusion of the ions so as to increase their conductivity. Diffusion of the implanted ions occurs in annealing due to the defects induced into the matrix during ion implantation along with the energy provided to the matrix via heat. Diffusion can occur at lower temperatures due to the induced defects in the matrix. Artisans will appreciate that temperatures and holding times may be determined depending on such factors as the size and material of construction of the emitter, the type of conducting centers implanted, and the like.

Annealing should not be carried out to an extent to cause long-range diffusion of the ions, so as to lower their collective conductivity. Preferably, the emitter is annealed to an extent to cause the implanted ions to substantially convert to crystalline form. Steps of local annealing may be performed should it be undesirable or impractical to subject the whole emitter to annealing. By way of example, point laser annealing methods may be used through which laser energy is directed at a particular region of the emitter (e.g., the well) to anneal only that portion.

Other steps of annealing may also be practiced. In particular, use of a bias in combination with annealing may be advantageous to allow for sufficient ion diffusion at a lower annealing temperature and/or shorter time than would be possible using annealing alone. In particular, through the application of a bias to the thin metal layer, the so-called electron wind phenomenon may be taken advantage of to reduce the activation energy for diffusion of the ions in the dielectric matrix. The amount of bias to be applied will vary depending on factors such as the annealing temperature and time used, the thickness of the dielectric layer, and the like.

An advantage of a method of the invention is that it is substantially self-aligned in that the conducting centers need not be concentrated with precision when being implanted. That is, should some ions "miss" their target and strike the emitter adjacent to the well, such miss-implanted ions should be electrically irrelevant. Metal features that are often present in the plurality of layers over the thin metal layer such as metal interconnects, emitter rings, photo-resist, and thick dielectrics act as implant masks. Additionally, ions that may be implanted in one or more of the plurality of layers over the thin metal layer will be too distantly spaced from the electron source layer to act as quantum tunneling conducting centers.

It will be understood that there are many additional and alternative steps to those discussed with reference to the preferred method 600 that may be practiced in other method embodiments. By way of example, the conducting centers could be deposited in the dielectric layer earlier in the manufacturing process if desired. Implanting could take place, for instance, before the thin metal layer was deposited over the dielectric layer, or after the thin metal layer was deposited but before any subsequent film layers were deposited. This could be desirable, for example, in order to use a higher annealing temperature than may be possible later in the manufacturing process. By way of additional example, it may be desirable to implant the entire dielectric area early in the manufacturing process, and then anneal only selected portions of the layer that are desired to form emission areas.

By way of additional example, the thin metal layer could be deposited later in the manufacturing process if desired. The thin metal layer could, for instance, be deposited after the well is etched. Such a sequence may be desirable to avoid damage of the thin metal layer during etching of the well. In this case, the plurality of film layers would be deposited on the dielectric layer. An advantage of the method of the invention, in fact, is that it provides for flexibility whereby the thin metal layer may be deposited early or late in the manufacturing process. Thus, for instance, should design parameters for an emitter change at some point during its lifetime and it suddenly become advantageous to deposit the thin metal layer late in the manufacturing process, the method of the present invention would allow for such a change in sequence to be relatively easily accomplished.

Also, with reference to methods of the invention, it will be understood that the steps of the invention are not limited to the sequence as discussed with reference to example method embodiments described herein. Further, the method steps, while discussed with respect to a single device, may be carried out for the simultaneous production of one or many devices. Artisans will also appreciate that the steps of FIG. 6 illustrate significant steps of a preferred process, and ancillary processes may be carried out in practice along with the steps illustrated in FIG. 6.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. For example, it will be appreciated that many applications in addition to a memory and a visual display may be practiced using an emitter of the invention.

Various features of the invention are set forth in the appended claims.

The invention claimed is:

1. An emitter for emitting electrons, the emitter comprising:
   an electron source layer;
   a dielectric layer formed on said electron source layer;
   a thin metal layer formed on said dielectric layer; and,
   a plurality of spaced apart conducting centers in said dielectric layer, at least a portion of said conducting centers located at varying depths in said dielectric layer, said conducting centers comprising clusters of metal ions.

2. An emitter for emitting electrons as defined by claim 1 wherein said conducting centers have been implanted in said dielectric layer and have a substantially spherical shape.

3. An emitter for emitting electrons as defined by claim 1 wherein each of said plurality of spaced apart metal ions are at least partially diffused.

4. An emitter for emitting electrons as defined by claim 1 wherein said metal ions are substantially crystallized.

5. An emitter for emitting electrons as defined by claim 1 wherein said metal ions comprise electrically isolated nanocrystals.

6. An emitter for emitting electrons as defined by claim 1 wherein the emitter further comprises:
   a plurality of film layers deposited on said thin metal layer; and,
   a well defined in said plurality of film layers to expose an emission area of said thin metal layer, said plurality of conducting centers proximate said emission area.

7. An emitter for emitting electrons as defined by claim 1 wherein said dielectric layer has a thickness of between about 0.01 and about 1 micron, and wherein said conducting centers have an approximate diameter of about 5 to about 100 Angstroms.

8. An emitter for emitting electrons as defined by claim 7 wherein said dielectric layer has a thickness of between about 0.01 micron and about 0.1 micron.

9. An emitter for emitting electrons as defined by claim 1 wherein said conducting centers comprise a transition metal and are separated from one another by a distance of about 10 to about 50 Angstroms.

10. An emitter for emitting electrons as defined by claim 1 wherein said conducting centers comprise a transition metal and are separated from one another by a distance of about 5 to about 25 Angstroms.

11. An emitter for emitting electrons as defined by claim 1 wherein said conducting centers have a diameter of between about 5 to about 50 Angstroms.

12. An emitter as defined by claim 1 wherein the emitter is disposed relative to a memory medium to direct emissions toward the memory medium and thereby cause an effect in said memory medium, and further comprising focusing means disposed between said emitter and said memory medium for focusing said emitted electrons.

13. An emitter as defined by claim 12 further comprising a mover for selectively moving one of the emitter or said memory medium relative to the other of the emitter or said memory medium.

14. An emitter as defined by claim 12 wherein said focusing means comprise an electrostatic focusing lens having an aperture in a conductor set at a predetermined voltage, said conductor voltage adjustable to change the focusing effect of said focusing lens.

15. An emitter as defined by claim 12 wherein the emitter comprises a plurality of emitters arranged in an array, wherein said focusing means comprises a plurality of focusing lens arranged in an array to cooperate with said emitter array, wherein said effect in said memory medium comprises a structural phase change in said medium, and wherein said memory medium further comprises an integrated reader circuit for detecting said structural phase change through measurement of electrical properties.

16. An integrated circuit comprising a plurality of integrated emitters, each of the emitters for emitting electrons, each of the emitters comprising:

an electron source layer comprised of a conducting metal or metallic compound;

a dielectric layer on said electron source layer, said dielectric layer having a thickness of between about 0.01 and about 1 micron, said dielectric layer comprising an oxide or a nitride of Ti or Si, said dielectric layer having a thickness of between about 0.01 and about 1 micron;

a thin metal layer on said dielectric layer, said thin metal comprised of one or more of Pt, Au or Ta, said thin metal layer having a thickness between about 20 to about 100 Angstroms;

a plurality of film layers on said thin metal layer;

an emitter well defined in said plurality of layers to expose at least a portion of said thin metal layer; and, a plurality of electrically isolated metallic crystals in said dielectric layer, said metallic crystals having an approximate diameter of about 5 to about 100 Angstroms, said crystals being separated from one another by a distance of about 5 to about 50 Angstroms.

17. An integrated circuit as defined by claim 16 further comprising:

a plurality of focusing means for focusing said electrons emitted from each of said emitters, one each of said focusing means proximate one each of said emitter wells;

a receiving medium for receiving said emitted electrons; and, a control circuit connected to said plurality of emitters for controlling said emitters.

18. An integrated circuit as defined by claim 17 wherein said receiving medium comprises a memory medium, said memory medium arranged in an array to store data, said memory medium further comprising a reader circuit for detecting a physical change in said receiving medium through measurement of electrical current.

19. An integrated circuit as defined by claim 17 wherein said receiving medium comprises a display medium having a plurality of pixels, each of said pixels for visually changing when said emitted electrons are received.

20. An emitter for emitting electrons, the emitter comprising:

an electron source layer;

a dielectric layer formed on said electron source layer;

a thin metal layer formed on said dielectric layer; and, a plurality of spaced apart conducting centers spatially arranged in said dielectric layer to facilitate quantum tunneling of electrons through said layer.

21. An emitter for emitting electrons as defined by claim 20 wherein said electron source layer comprises one of a metal or a metallic compound, said dielectric layer comprises a material of the formula $AO_x$ where A is one of Si or Ti, where x is any integer from 1 to 3, and wherein said conducting centers are comprised of Si when A is Si, and of Ti when A is Ti.

22. An emitter for emitting electrons as defined by claim 20 wherein the emitter is disposed relative to a display medium to selectively direct emissions toward said display medium, said display medium changing visually when said emissions are received.

23. An emitter as defined by claim 20 wherein the emitter comprises a plurality of individual emitters, and wherein the emitter further comprises control circuitry to control said plurality of emitters.

24. An integrated circuit comprising the emitter as defined by claim 20 further comprising control circuitry for controlling the emitter.

25. An emitter as defined by claim 20 wherein said dielectric layer has a thickness of between about 0.01 and about 1 micron, and wherein said conducting centers have an approximate diameter of about 5 to about 100 Angstroms.

26. An emitter as defined by claim 20 wherein said conducting centers comprise a transition metal and are separated from one another by a distance of about 10 to about 50 Angstroms.

27. An emitter as defined by claim 20 wherein said conducting centers conducting centers comprise a transition metal and are separated from one another by a distance of about 5 to about 25 Angstroms.

28. An emitter as defined by claim 20 wherein said dielectric layer has a thickness of between about 0.01 micron and about 0.1 micron.

29. An emitter as defined by claim 20 wherein said thin metal layer is comprised of one or more of Al, Rh, Pt, Au, Ta, Mo, Ir, Ru, Cr, and TiN, and wherein said thin metal layer has a thickness of less than about 100 Angstroms.

30. An emitter as defined by claim 20 wherein said conducting centers have a diameter of between about 5 to about 50 Angstroms.

31. An emitter as defined by claim 20 wherein said conducting centers comprise electrically isolated clusters of metal ions.

32. An emitter for emitting electrons, the emitter comprising:

an electron source layer;

a dielectric layer formed on said electron source layer;

a thin metal layer formed on said dielectric layer;

a plurality of spaced apart conducting centers in said dielectric layer;

a plurality of film layers deposited on said thin metal layer; and, a well defined in said plurality of film layers to expose an emission area of said thin metal layer, said plurality of conducting centers proximate said emission area.

33. An emitter for emitting electrons as defined by claim 32 wherein said thin metal layer is comprised of one or more of Al, Rh, Pt, Au, Ta, Mo, Ir, Ru, Cr, and TiN, and wherein said thin metal layer has a thickness of less than about 100 Angstroms.

34. An emitter for emitting electrons as defined by claim 32 wherein said thin metal layer comprises Pt and has a thickness of between about 20 and about 100 Angstroms.

35. An emitter as defined by claim 32 wherein said conducting centers have a diameter of between about 5 to about 50 Angstroms.

36. An emitter as defined by claim 32 wherein said conducting centers comprise a transition metal and are separated from one another by a distance of about 10 to about 50 Angstroms.

37. An emitter as defined by claim 32 wherein said conducting centers comprise clusters of a transition metal separated from one another by a distance of about 5 to about 25 Angstroms, and wherein said thin metal layer has a thickness of less than about 100 Angstroms.

38. An emitter for emitting electrons, the emitter comprising:

an electron source layer;

a dielectric layer formed on said electron source layer;

a thin metal layer formed on said dielectric layer;

a plurality of spaced apart conducting centers in said dielectric layer; and, wherein the emitter is disposed relative to a memory medium to direct emissions toward the memory medium and thereby cause an effect in said memory medium, and further comprising focusing means disposed between said emitter and said memory medium for focusing said emitted electrons.

39. An emitter as defined by claim 38 further comprising a mover for selectively moving one of the emitter or said memory medium relative to the other of the emitter or said memory medium.

40. An emitter as defined by claim 38 wherein said focusing means comprise an electrostatic focusing lens having an aperture in a conductor set at a predetermined voltage, said conductor voltage adjustable to change the focusing effect of said focusing lens.

41. An emitter as defined by claim 38 wherein the emitter comprises a plurality of emitters arranged in an array, wherein said focusing means comprises a plurality of focusing lens arranged in an array to cooperate with said emitter array, wherein said effect in said memory medium comprises a structural phase change in said medium, and wherein said memory medium further comprises an integrated reader circuit for detecting said structural phase change through measurement of electrical properties.

42. An emitter as defined by claim 38 wherein said thin metal layer is comprised of one or more of Al, Rh, Pt, Au, Ta, Mo, Ir, Ru, Cr, and TiN, and wherein said thin metal layer has a thickness of less than about 100 Angstroms.

43. An emitter as defined by claim 38 wherein said conducting centers comprise a transition metal and are separated from one another by a distance of about 10 to about 50 Angstroms, and wherein said dielectric layer has a thickness of between about 0.01 micron and about 0.1 micron.

44. An emitter as defined by claim 38 wherein said conducting centers are spatially arranged to promote quantum tunneling through said dielectric layer and have a diameter of between about 5 to about 50 Angstroms.

* * * * *